March 24, 1970  E. E. HADLEY  3,502,387
TELESCOPE SYSTEM
Filed July 19, 1966  3 Sheets-Sheet 1
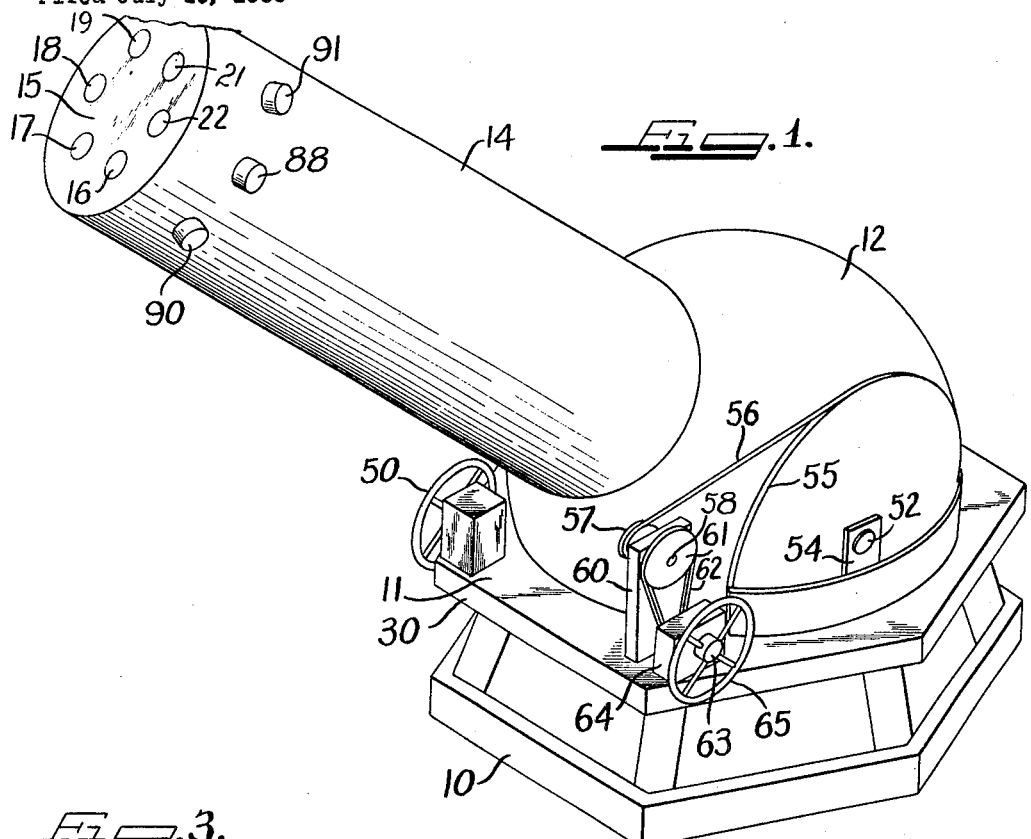
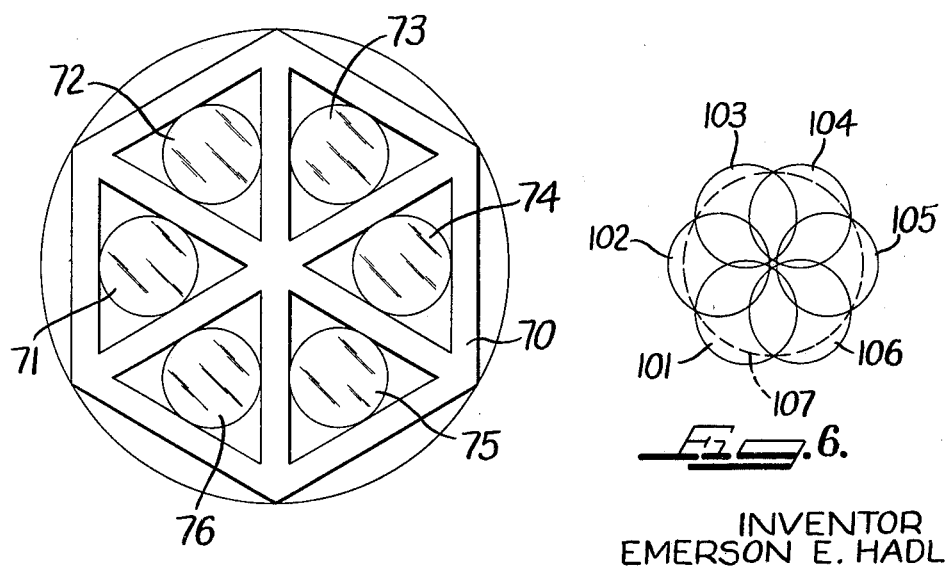
INVENTOR
EMERSON E. HADLEY
BY Mason, Albright & Stansbury
Attys.

March 24, 1970  E. E. HADLEY  3,502,387
TELESCOPE SYSTEM

Filed July 19, 1966  3 Sheets-Sheet 2

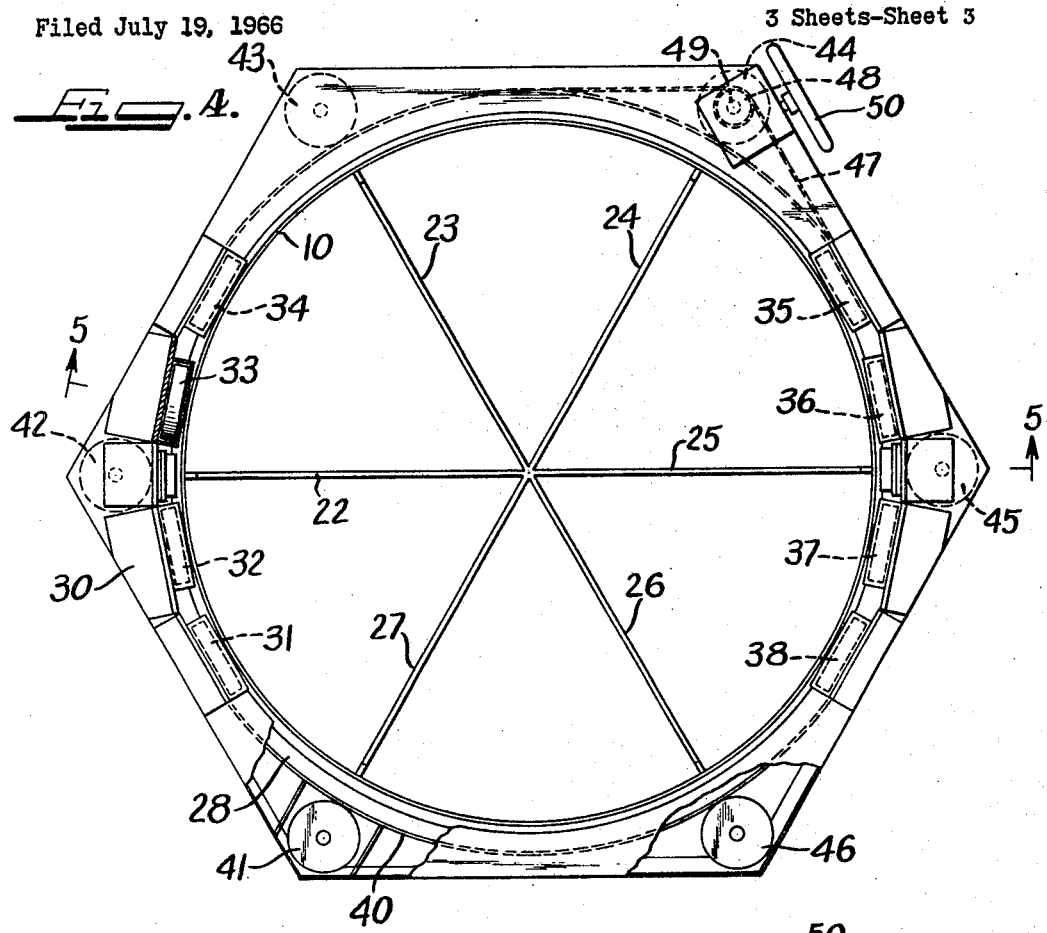
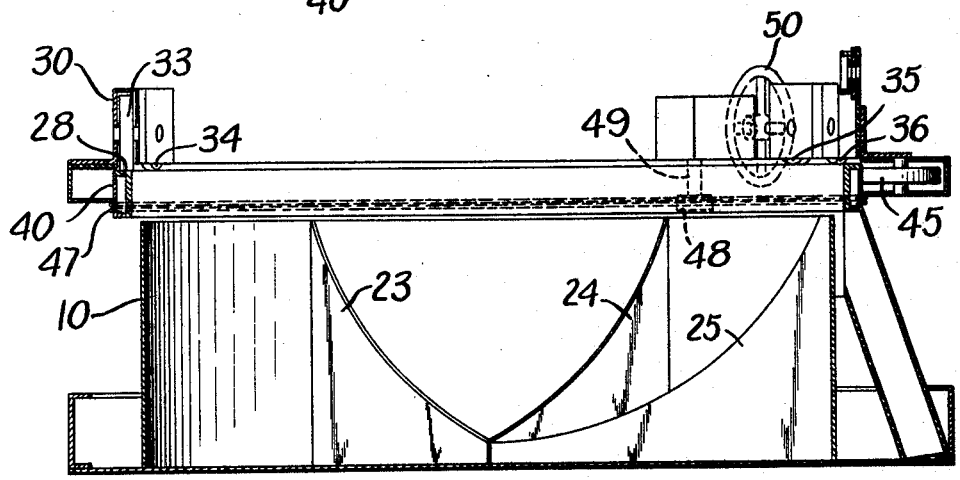

United States Patent Office 3,502,387
Patented Mar. 24, 1970

3,502,387
TELESCOPE SYSTEM
Emerson E. Hadley, Eau Gallie, Fla.; Doris J. Hadley, Eau Gallie, Emerson Rea Hadley, Titusville, and Joanne B. Long, Eau Gallie, Fla., heirs of said Emerson E. Hadley, deceased
Filed July 19, 1966, Ser. No. 566,321
Int. Cl. G02b 17/00, 21/24, 23/16
U.S. Cl. 350—55
9 Claims

ABSTRACT OF THE DISCLOSURE

A telescope having multiple primary mirrors whose fields of view overlap so that separate television cameras receive an image from each mirror and feed the optical information to either separate monitors for display, an overlaping display system providing a single image with a large field of view or a color display system. The mounting system of the telescope is a hollow sphere with an elongated portion extending therefrom; the sphere portion being in a center cavity with connecting drive cables for the smooth tracking of bodies in the skies.

---

The present invention relates to reflecting telescope systems and in particular to reflecting telescopes which provide multiple images for television display.

Color television requires the use of at least three photosensitive tubes, one for each of the primary colors. It is difficult in the color television field to place the lenses of three photosensitive tubes such as image orithicons and vidicons sufficiently close together to receive a good image at the same desired image plane. Therefore, it is desirable to produce three separate images by telescopic means which are identical images of distant objects such as astronomical bodys, satellites and other distant objects from the location of television sensing equipment. The present invention makes it possible for a telescope to track astronomical bodys, satellites, missiles and other bodies moving rapidly across the skies and provide multiple images that can be picked up by color television cameras to produce a color television display of the body being tracked in the sky.

As the diameter of the mirrors utilized in telescopes increase, the difficulties of manufacturing them increase significantly, and the cost increases exponentially with increasing diameters. Therefore to cover a given field of view of the sky, it may be more economical to construct a number of small mirrors which have overlapping fields of view and to display these fields of view on separate television monitors than to provide a telescope with a single primary mirror that can cover the desired field of view. The present invention provides a telescope having multiple primary mirrors whose fields of view overlap so that separate television cameras can receive an image from each mirror and feed the optical information to either separate monitors for display or to a display system which overlaps the images to provide a single image having a large field of view. Thus a given field of view having a given magnification can be provided by smaller multiple mirrors which are easier and more economical to manufacture than a single mirror which would provide equivalent results.

It is therefore an object of the present invention to provide a new and improved telescope and telescopic system.

A further object is to provide a reflecting telescope which can provide multi-images of either the same field of view or overlapping field of view.

Another object is to provide a reflecting telescopic system which can provide a color TV display.

An additional object is to provide a new and improved mount for a reflecting telescope which will allow fast moving objects in the sky such as satellites and missiles to be smoothly tracked.

Further objects and advantages will become apparent from the following detailed description taken in connection with accompanying drawings, in which:

FIGURE 1 is a perspective view of a preferred embodiment of the present invention;

FIGURE 3 is a partial view of the primary mirror arrangement of the embodiment of the invention shown in FIGURES 1 and 2 taken along the lines 3—3 in FIGURE 2;

FIGURE 4 is a top view of the mount of the embodiment of the invention illustrated in FIGURES 1 and 2 with the telescope removed; and FIGURE 5 is a sectional view of the mount shown in FIGURE 4 taken along the lines 5—5.

FIGURE 6 shows the various fields of view.

FIGURE 2 is also taken along the lines 5—5 in FIGURE 4.

Figure 2:
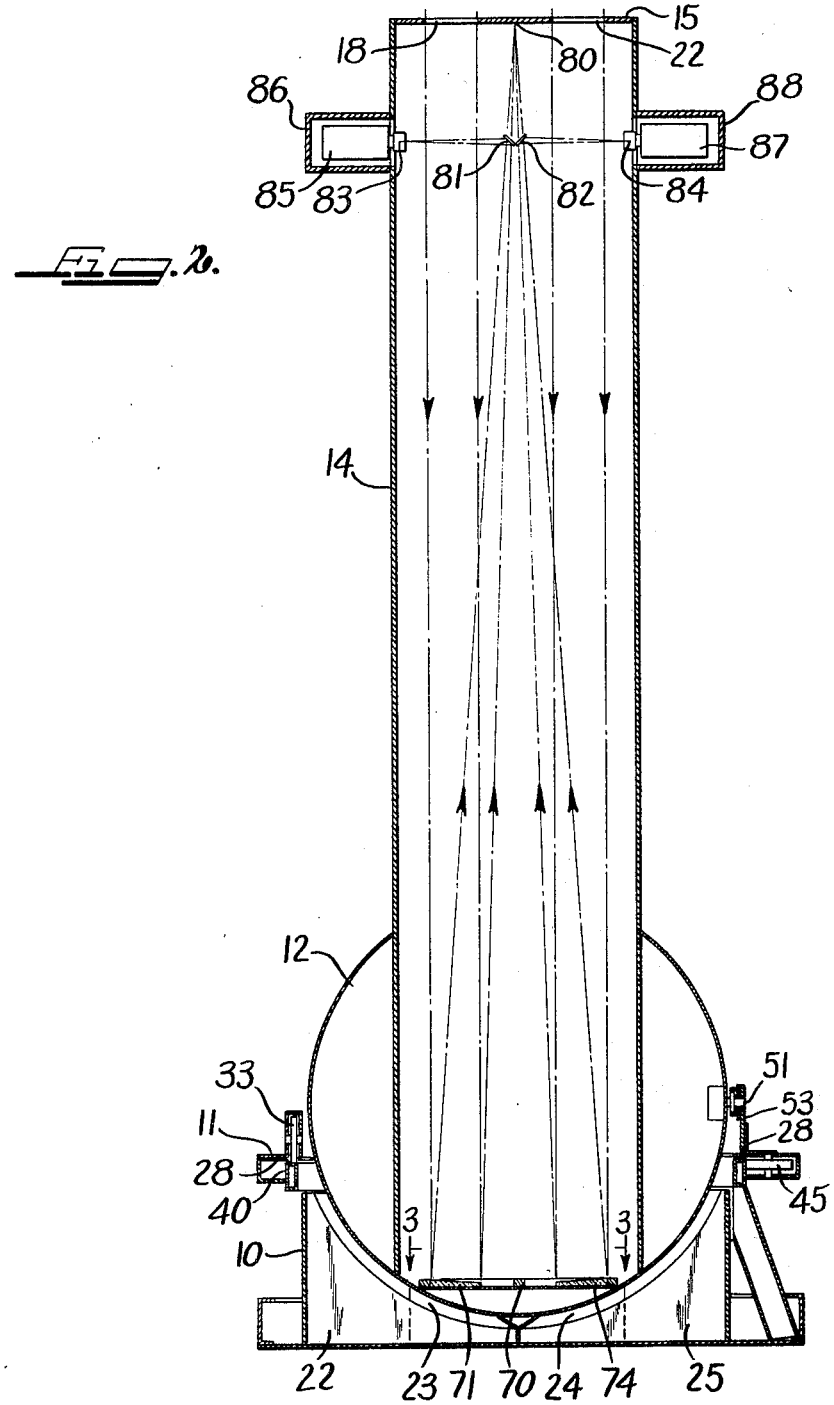
FIGURE 2 is a cross-sectional drawing of the embodiment of the invention illustrated in FIGURE 1 with the telescope raised to a Zenith position.

While this invention is susceptible of embodiment in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

The movements of tracking telescopes at the present time are generally achieved through some type of a gearing. Gearing has a certain amount of lost motion (backlash) inherent therein. The preferred embodiment of the invention illustrated in the drawing utilizes only cable and belt drive means for transmitting motion to the telescope. Thus by use of the embodiment of the invention illustrated in the drawings smoother tracking of bodies in the sky can be achieved than is possible with conventional telescope mounts.

Referring now to FIGURES 1 and 2, a telescope system is illustrated which includes a mount 10, an annular training member 11 rotatably mounted thereon, a hollow sphere 12 rotatably mounted on the training member 11, and a hollow elongated member 14 extending outwardly from the sphere 12. The sphere 12 and the elongated member 14 are rigidly secured to each other. The elongated member 14 has an end surface 15 with six symmetrically placed apertures 16–21 for receiving light.

As may more easily be observed in FIGURES 4 and 5 the mount 10 has a series of rib members 22–27 extending from the center of the mount and so placed as to define a central spherical cavity for receiving the sphere 12. An annular training surface 28 is provided on the mount 10.

The annular training member 11 includes a hexagon shaped annular member 30 which has a series of rollers 31–38 rotatably mounted thereon, which roll upon the annular training surface 28. The horizontal alignment of the annular training member 11 with the base 10 is maintained by six rollers 41–46 rotatably mounted on the hexagon member 30 by rotatably bearing again an annular roller path surface 40 on the mount 10. The roller path surface 40 extends sufficiently downward to receive a drive cable 47 thereon the drive cable 47 is wrapped twice around the roller surface and around a pulley 48 which is rotatably mounted on the hexagon member 30 by a shaft 49 upon which the pulley 48 is rigidly secured. Through suitable gearing, well known to those skilled in the art, the pulley 48 and the shaft 49 are connected for the purpose of being driven by a hand wheel 50 rotatably mounted on training member 11. The cable 48 may be secured at one point to the base 10 or it may depend only upon friction to maintain a tight grasp on the roller bearing surface 40. Rotation of the hand wheel 50 rotates the pulley 48 thereby forcing the shaft 49 to move relative to the base 10. Since the shaft 49 is rotatably secured to the hexagon member 30 the entire annular training member 11 rotates in a horizontal plane relative to the base 10.

Referring again to FIGURES 1 and 2, a pair of short shafts 51 and 52 are rigidly secured to the sphere 12 and extend therefrom on the same axis. The shafts 51 and 52 are received in bearings carried by the brackets 53 and 54 respectively. The brackets 53 and 54 are rigidly mounted on the hexagon member 30. Thus the sphere 12 is received in the cavity formed by the base 10 and has two axes of rotational freedom.

Referring to FIGURE 1, the sphere 12 has an annular track 55 secured thereon for receiving a drive cable 56 which is preferably wound around the annular track 55 at least twice. The cable 56 passes around a pulley 57 preferably at least twice. The pulley 57 is secured to a shaft 58 which is rotatably mounted in bearings carried by the bracket 60. The bracket 60 is rigidly secured to the hexagon member 30. A pulley 61 is rigidly secured to the other end of the shaft 58 and has a belt 62 passing thereover. The belt 62 passes around another pulley (not shown) which is secured to a shaft 63 that is rotatably mounted in a bracket 64. The bracket 64 is rigidly secured to the hexagon member 30. A hand wheel 65 is secured to the other end of the shaft 63. The cable 56 and the belt 62 are maintained in reasonably taut condition so that there is no slippage between the positioning of the hand wheel 65 and the resulting position of the sphere 12. The weight of the longitudinal member 14 may be counterbalanced by weights placed in the sphere 12 to relieve the stress placed upon the cable 56 and the belt 62 for merely holding the elongated member 14 in position against the force of gravity. The illustrated cable drive system has been found to be superior to gear drive systems in that there is no slippage between the hand wheel 65 and the sphere 12 as is commonly found in gear and shaft systems. The telescope may be elevated and depressed by the hand wheel 50 without any backlash or lost motion as long as the cable 56 and the belt 63 are maintained in reasonably taut condition.

The mount, training drive system and the elevation drive system having been described, the optical system will be described in detail by reference to FIGURES 2, 3 and 6. A primary mirror bracket 70 is secured in the sphere 12 as shown in FIGURE 2 and rigidly holds six 6-inch spherical concave primary mirrors 71–76 as shown in FIGURE 3. Each of these primary mirrors 71–76 receives light from the field of view through the respective apertures 16–21 as do conventional reflecting telescopes. For purposes of simplifying the description the optical arrangement associated with only primary mirrors 71 and 74 will be described. The optical systems of which mirrors 72, 73, 75 and 76 are a part thereof are identical to the optical systems containing mirrors 71 and 74. All of the spherical mirrors 71–76 are positioned to have a common prime focus 80. Two flat mirrors 81 and 82 are secured in the elongated member 14 to act as plane secondary mirrors to provide respective Herchelian focuses 83 and 84. A television camera 85 is secured in a bulge section 86 of the elongated member 14, and a television camera 87 is secured in a bulge section 88 of the elongated member 14. The cameras 83 and 84 are so positioned adjacent the respective Newtonian focuses 83 and 84 that camera 85 receives an optical image from primary mirror 71 and camera 87 receives an optical image from the primary mirror 74. As may be seen in FIGURE 1 bulge sections for six cameras are symmetrically placed around the circumference of elongated member 14. In addition to bulge 86 bulges 90 and 91 are visible in FIGURE 1. Cameras such as cameras 85 and 87 are connected to either a closed circuit television system or to radiating television transmitting systems by suitable cables well known to those skilled in the art.

For producing a color television display of tracked bodies at least three of the six cameras are color television cameras each receiving a different primary color. By the use of six color television cameras, of which two different cameras are each receiving a different one of the three primary colors, two different fields of view may be displayed in color simultaneously. Instead of having a prime focus such as 80 for all six cameras two common prime focuses are utilized one, for one set of three color television cameras each receiving a different primary color and one for the other three color television cameras each receiving a primary color. The fields of view of the two resulting color displays may be overlapping to provide a wider field of view or may be separated depending upon the positioning of the mirrors to locate the two common focuses.

When the embodiment of the invention illustrated in the figures is utilized for providing black and white television displays a common prime focal point 80 is not normally utilized. Instead six separate focuses are established so that the resulting fields of view may overlap or may be completely separated. For the purpose of establishing a continuous expanded field of view greater than that obtainable by any one of the primary mirrors, the six prime focal points may be arranged symmetrically so that the field of view provided by the primary mirrors 71–76 provides an overall field of view as illustrated generally at dashed circle 107 in FIGURE 6 having respective fields of view 101–106. This arrangement provides continuous coverage out to the dashed circle 107 which has a diameter of approximately 1.7 times the diameter of each individual primary mirror. Those skilled in the art will recognize that there is no structural limitation to the number of mirrors which might be utilized in such a system to expand and cover a wider total field of view. Thus for example a greater field of view still can be obtained by adding twelve more Herchelian optical systems with twelve more cameras to the original six to extend the field of view illustrated in FIGURE 6 to approximately 2.4 times the diameter of each equal size primary mirror in the multi-mirror telescope. Those skilled in the art will further recognize that any combination of colored television field of view and/or black and white may be utilized to meet specialized requirements. Thus the present invention makes it possible not only to produce color television displays of tracked objects in the sky, but it also makes it possible to observe a larger field of view from a telescope system of a given focal length than has been possible in the past.

While Herchelian configurations have been utilized in the preferred embodiment shown and described, it will be understood by those skilled in the art that the term Herchelian is intended to encompass Newtonian configurations (secondary mirrors in path of the incoming light) and other configurations which provide for a focus outside the path of light from the receiving aperture to the primary mirror by the utilization of secondary mirrors.

I claim:
1. A reflecting telescope comprising:
   a mount defining a central cavity and having an annular training surface completely surrounding said central cavity,
   an annular training member having rollers riding on said training surface for horizontal rotation thereon,
   a hollow sphere rotatably mounted on said annular training member about a horizontal axis and extending downwardly into said central cavity of said mount, a hollow elongated member extending outwardly to an end surface from said sphere and having optical reflecting means with an aperture means in said end surface for receiving light, and a concave mirror mounted in said sphere optically aligned with said aperture and said reflecting means to receive light from said aperture means to form an optical image therefrom.

2. In combination with the reflecting telescope specified in claim 1:

an annular track secured to said sphere for receiving a drive cable, drive means mounted on said annular training member and connected to said cable for elevating said hollow elongated member by rotating said sphere, an annular surface on said mount for receiving another drive cable, and drive means mounted on said annular training member and connected to said another drive cable for training said hollow elongated member by rotating said annular training member.

3. A reflecting telescope system comprising:

a mount defining a central cavity and having an annular training surface completely surrounding said central cavity, an annular training member having rollers riding on said training surface for horizontal rotation thereon, a hollow sphere rotatably mounted on said annular training member about a horizontal axis and extending downwardly into said central cavity of said mount, an elongated hollow rigid body extending outwardly to an end surface and having aperture means in said end surface for receiving light, a multiplicity of concave mirrors mounted inside said body and optically aligned with said aperture to receive light from said aperture means, said concave mirrors, a multiplicity of flat mirrors secured to said body, each said flat mirror being positioned relative to one of said concave mirrors to provide a Herchelian focus, and a multiplicity of television cameras, each said camera being secured to said body adjacent one said Herchelian focus and receiving an optical image produced by the corresponding concave and flat mirrors.

4. A reflecting telescope system in accordance with claim 3, wherein at least three of said multiplicity of television cameras are color cameras each receiving a different primary color.

5. A reflecting telescope as specified in claim 1, wherein said optical reflecting means is a flat mirror secured to said elongated member and positioned relative to said concave mirror to provide a Herchelian focus, and a television camera secured to said body adjacent said Herchelian focus to receive an optical image produced by said mirrors.

6. The reflecting telescope as specified in claim 1 having a prime focus and a television camera secured to said body adjacent said prime focus to receive an optical image produced by said mirror.

7. A reflecting telescope system comprising a mount defining a central cavity and having an annular training surface, completely surrounding said central cavity, an annular training member having rollers riding on said training surface for horizontal rotation thereon, a hollow sphere rotatably mounted on said annular training member about a horizontal axis and extending downwardly into said central cavity of said mount, a hollow elongated member extending outwardly to an end surface from said sphere and having an aperture means in said end surface for receiving light, and a multiplicity of concave mirrors mounted inside said body at the other said end to receive light from said aperture means, said concave mirrors being positioned to have a common prime focus, and to be optically aligned with said aperture means, a multiplicity of flat mirrors secured to said body, each said flat mirror being positioned relative to one of said concave mirrors to provide a Herchelian focus, and a multiplicity of television cameras, each said camera being secured to said body adjacent one said Herchelian focus and receiving an optical image produced by the corresponding concave and flat mirrors.

8. A reflecting telescope system in accordance with claim 7, wherein at least three of said multiplicity of television cameras are color cameras, each receiving a different primary color.

9. A reflecting telescope system in accordance with claim 7, wherein at least six of said multiplicity of television cameras are color cameras, two of each receiving a different primary color.

References Cited

UNITED STATES PATENTS

| 471,708 | 3/1892 | Rudall | 350—55 |
|---|---|---|---|
| 749,754 | 1/1904 | Spear | 350—31 |
| 3,118,340 | 1/1964 | Iwerks | 350—299 X |
| 1,428,935 | 9/1922 | Bell | 350—83 X |
| 2,366,410 | 1/1945 | Klemperer | 350—85 X |
| 2,784,256 | 3/1957 | Cherry | 178—5.4 |
| 3,257,728 | 6/1966 | Blomquist | 350—85 |

FOREIGN PATENTS

| 1,327,649 | 7/1961 | France. |
|---|---|---|
| 35,519 | 10/1930 | Netherland. |
| 146,373 | 4/1921 | Great Britain. |
| 720,087 | 12/1954 | Great Britain. |
| 880,503 | 5/1953 | Germany. |

PAUL R. GILLIAM, Primary Examiner

U.S. Cl. X.R.

350—32, 83, 85, 299